(No Model.)

R. M. DIXON.
COCK.

No. 540,727. Patented June 11, 1895.

Witnesses:
J. M. Witherow
Louis G. Julihn

Inventor:
R. M. Dixon,
By Joseph K. Pickens
Attorney

THE NORRIS PETERS CO., PHOTO-LITHO., WASHINGTON, D. C.

UNITED STATES PATENT OFFICE.

ROBERT M. DIXON, OF EAST ORANGE, NEW JERSEY, ASSIGNOR TO THE SAFETY CAR HEATING AND LIGHTING COMPANY, OF NEW JERSEY.

COCK.

SPECIFICATION forming part of Letters Patent No. 540,727, dated June 11, 1895.

Application filed March 17, 1894. Serial No. 504,051. (No model.)

*To all whom it may concern:*

Be it known that I, ROBERT M. DIXON, of East Orange, county of Essex, State of New Jersey, have invented certain new and useful Improvements in Cocks, of which the following is a specification, reference being had to the accompanying drawings.

The object of my invention is to provide improvements in cocks especially designed for steam heating purposes, in which all danger of leakage into a car or chamber in which it is employed is avoided.

Great difficulty has been experienced in practice in making, by the ordinary methods, an absolutely steam-tight cock and one which will remain so for any considerable period of constant use. By my invention I provide means for preventing the escape of steam through the case and means for draining off any water of condensation that may be occasioned by leakage around the bearing part within the case.

Figure 1:
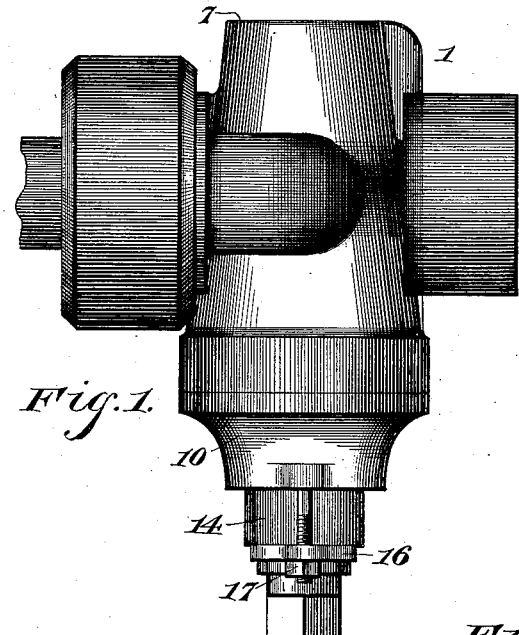
Figure 2:
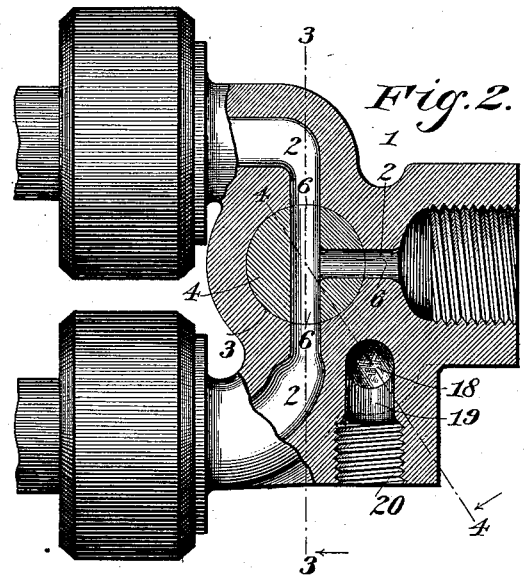
Figure 3:
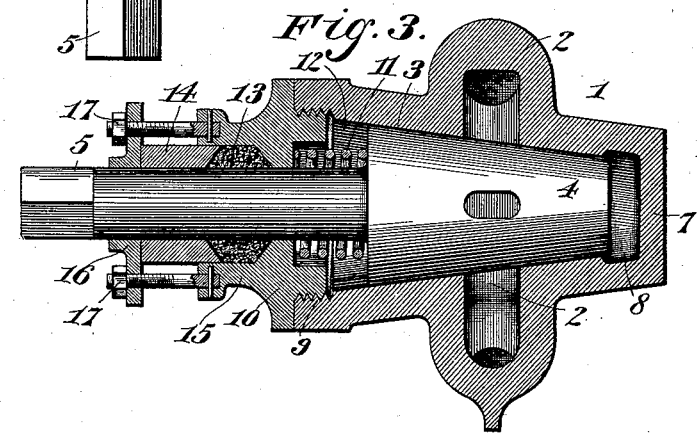
Figure 4:
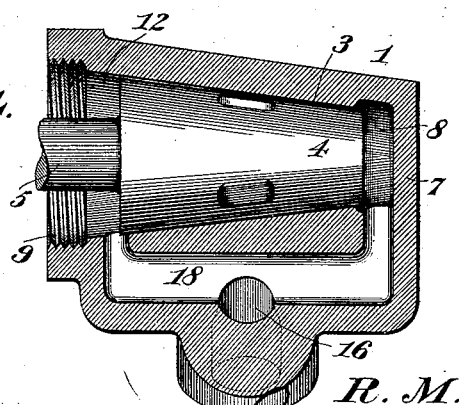

In the accompanying drawings, Figure 1 is a top plan view of my cock-case. Fig. 2 is an elevation, partly in section, thereof, the valve therein being shown as a three-way valve, which, however, is not an essential feature of the invention. Fig. 3 is a section on the line 3 3 of Fig. 2, the valve and stem being shown in elevation. Fig. 4 is a similar section on the line 4 4 of Fig. 2, in which it may be noticed that the line of section indicates that parts of the case are omitted.

Referring to the figures on the drawings, 1 indicates the case of my cock which may be made of any suitable construction and having exits and entrances as adapted to the purpose for which it is to be applied. In the drawings it is shown with three ports indicated by 2, and has a tapered bore 3 within which tightly fits a tapered valve 4 provided with a stem 5 for operating it. The valve, as shown, has three ports 6 to correspond with the ports in the case, but the number and arrangement of the ports are merely incidental and are not involved in the gist of the invention itself.

It is a matter of ordinary usage to construct a cock with a tapered bore and a tapered valve, the parts being generally ground together in order to secure a tight joint. It is ascertained in practice, however, that with the utmost care, leakage is apt to occur between the valve and its bore, if not when they are originally fitted, at least after they have been used for any considerable length of time. It is to avoid the escape of steam through such defective bearings that my invention is devised. To accomplish this object I provide a wall 7 opposite the small end of the valve that entirely closes the case at that end, preferably being made integral with the case. Between the end of the valve and the wall 7 a chamber 8 is provided, both to afford endwise movement of the valve such as may be occasioned by the wear of the bearing parts, and also a drainage reservoir for any water of condensation that may leak around the valve into it. To the other end of the case, within a screw threaded aperture 9, I provide a flanged cap 10 of ordinary construction. The joint between the cap and the case is preferably a finished one similar to that used on all globe valves and which can be made tight without difficulty. A spring 11 coiled around the stem 5, and retained by the cap 10, serves to hold the valve in place. A chamber 12 between the valve and the cap is designed, like the chamber 8, to receive any water of condensation which may escape around the bearing parts of the valve into it.

It is possible by the employment of suitable packing 13 and a gland 14 in the neck 15 of the cap to absolutely prevent the escape of any steam around the stem of the valve. The gland may be adjustably secured in place by an oblong collar 16 and the ordinary adjustment bolts and nuts 17.

Having provided chambers at each end of the valve to receive the water of condensation which may escape into them, I prefer to employ a duct 18 communicating with each valve and with a discharge port 19 by which the water of condensation may be conducted away as it accumulates. The interior of the port 19 is shown screw threaded, as at 20, so that it may accommodate a drain pipe by which it may be discharged at any desirable point.

What I claim is—

1. In a cock, the combination with a case and valve, of an inclosed chamber in the casing beyond one end of the valve, a duct entirely within the casing communicating directly with the chamber and with the exterior of the cock casing, substantially as specified.

2. In a cock, the combination with the case, and valve therein, of chambers above and below the valve, a duct entirely within the casing and communicating with both chambers, and having an outlet communicating directly with the exterior of the valve casing, substantially as specified.

In testimony of all which I have hereunto subscribed my name.

ROBERT M. DIXON.

Witnesses:
ELMER E. ALLBEE,
D. W. PYE.